United States Patent [19]

Swanson

[11] 4,178,573

[45] Dec. 11, 1979

[54] ELECTRICALLY OPERATED DEVICE AND VALVING MECHANISM EMPLOYING SAME

[75] Inventor: Wesley S. Swanson, Elk Grove Village, Ill.

[73] Assignee: Eaton Corporation, Cleveland, Ohio

[21] Appl. No.: 854,182

[22] Filed: Nov. 23, 1977

[51] Int. Cl.$^2$ .............................................. H01F 7/16
[52] U.S. Cl. .................................. 335/255; 251/130; 335/269
[58] Field of Search .............. 335/255, 269, 264, 244, 335/258; 251/30, 38, 45, 65, 130

[56] References Cited

U.S. PATENT DOCUMENTS

| | | | |
|---|---|---|---|
| 3,429,340 | 2/1969 | Opel et al. | 251/130 |
| 3,672,627 | 6/1972 | McCarty, Jr. et al. | 251/30 |
| 3,784,154 | 1/1974 | Ostrowski et al. | 251/30 |
| 3,989,222 | 11/1976 | Yoshiyasu | 251/130 |
| 4,056,255 | 11/1977 | Lace | 251/65 |

*Primary Examiner*—Harold Broome
*Attorney, Agent, or Firm*—R. J. McCloskey; E. C. Crist; R. A. Johnston

[57] ABSTRACT

An electrically operated valve having a mechanically actuated position for valving a fluid port between an open and closed position. A first tubular pole member contained within an electrical coil is movable between a first and second position with respect to a second, stationary, coaxially aligned tubular pole member. A reset spring urges the first pole member toward the first position. An armature, having a valve sealing surface at one end, is movable between first and second positions for alternately closing and opening a fluid port. The first pole member defines an air gap with respect to the second pole member which, during energization of the electrical coil, has associated therewith a magnetic flux with accompanying lines of magnetic force. One end of the armature is spaced closely adjacent to the air gap so that, upon energization of the coil, the magnetic force lifts the armature to the second position, overcoming a second biasing spring which normally maintains the armature in the first position. The armature can be returned to the first position while the coil is energized by actuating a reset button attached to the first pole member. Mechanical actuation of the reset button moves the first pole member into contact with the second pole member, closing the air gap and permitting the second biasing spring to return the armature to the first position, closing the fluid port.

18 Claims, 4 Drawing Figures

4,178,573

ELECTRICALLY OPERATED DEVICE AND VALVING MECHANISM EMPLOYING SAME

BACKGROUND OF THE INVENTION

Automatic dishwashers and washing machines typically require a float and switch arrangement for controlling water levels. Electrically operated timing devices are also used to control water levels in appliances.

A problem encountered with the above-described prior art control devices has been failure of the switch associated with the control arrangement resulting in an overflow or flood condition which could only be prevented if the operator were on hand to cut off the appliance power supply.

A further problem encountered with prior art devices has been that heretofore it was difficult to control the accuracy and repeatability of the water levels which was, in part, due to an accumulation of broad manufacturing tolerances inherent in low-cost timing devices and float arrangements.

SUMMARY OF THE INVENTION

In the present invention, a mechanical reset feature is provided which, upon actuation of a button, permits an electrically operated valve, such as a solenoid valve, to be shut off while the electrical coil is still energized. This permits emergency shut-off on an appliance to protect against damage from electrical system malfunction as, for example, over-fill in a washing machine. In a separate application, the reset button can be connected to another control member, for example, a vacuum motor, to automatically shut-off a water supply valve. The force required to actuate the mechanical override feature is relatively low, which enables relatively light duty power sources to be used for actuation, for example, bimetallic temperature sensitive elements, heat motors and vacuum motors.

A second embodiment of the invention contains a pole piece stabilizer element which serves to magnetically retain the movable pole piece in the first position when the element experiences vibration or chatter caused by current fluctuations to the coil. In addition, the retaining force generated by the pole piece stabilizer is maintained substantially constant, permitting the mechanically actuated reset button to be engaged at a more predictable force, thereby achieving significantly improved valve control.

DETAILED DESCRIPTION

Figure 1:
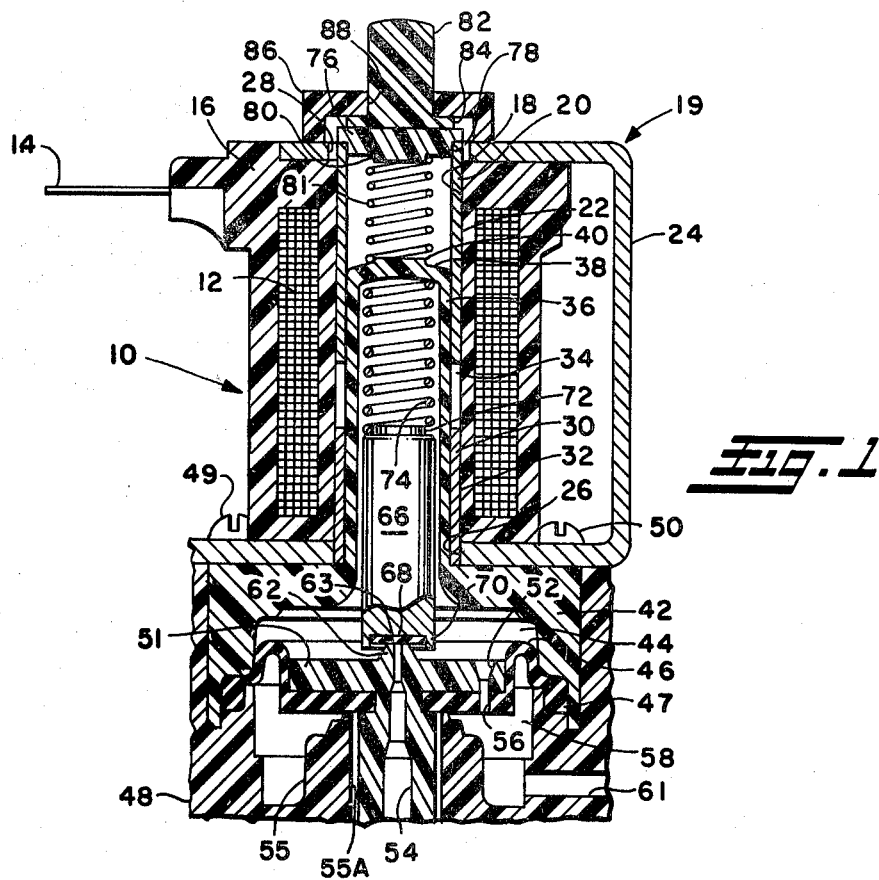
FIG. 1 is a cross-sectional view of the invention in the de-energized position with the lower end of the valve in partial cross-section.

Referring now to FIG. 1, the valve, indicated generally by reference numeral 10, is shown in the de-energized position. An electrical coil winding 12 is wound about a bobbin (not shown) with the ends thereof, also not shown, attached to a pair of electrical terminals, one of which is shown by reference numeral 14. The electrical coil winding and a portion of the electrical terminals have been encapsulated in a thermoplastic material 16, thus forming an insulated coil assembly. A cylindrical bore 18 is formed by the thermoplastic encapsulation of electrical coil winding 12. Ferromagnetic means 19 includes means defining a first magnetic pole in the form of pole piece 20 having an elongated tubular configuration and formed from a ferromagnetic material with an outer diameter 22 sized so as to slide within bore 18. The ferromagnetic means also includes means defining a second stationary pole in the form of pole piece 24 which has a generally C-shaped configuration which loops around the top and bottom surfaces of the electrical coil encapsulation. In the preferred practice holes 26 and 28 are formed in the bottom and top portions of the second pole piece, respectively, and are axially aligned with respect to bore 18. The stationary pole also preferably includes a third pole piece 30 having an elongated tubular configuration with an outer diameter 32 conforming to, and extending into, the lower portion of bore 18. The third pole piece is retained to the second pole piece by a press fit connection between diameter 32 and hole 26. It will be understood, however, that the ferromagnetic means 19 may be formed of only two pole pieces, if desired, with the stationary pole being formed of a unitary member. An air gap 34 is defined by the lower end of first pole piece 20 and the upper end of tubular section 30. The effect upon operation of the device by air gap 34 will be subsequently described with respect to valve operation.

A guide tube 36 extends into third pole piece 30 and the lower portion of first pole piece 20. Guide tube 36 has a closed end portion 38 formed along the upper end thereof and has a raised, registering diameter 40 located along the top surface thereof. An upper valve body section 42 is integrally formed with guide tube 36. The inner surface of valve body section 42 forms a portion of an upper fluid chamber 44. A flexible diaphragm 46, having a peripheral lip 47 is mounted in valve body section 42. A lower valve body section 48, only a portion of which is shown, sealingly engages with valve body section 42 and peripheral lip 47. Pole piece 24 and valve body sections 42 and 48 are fastened together by any suitable expedient such as screws 49 and 50. An insert 51 which is shown in cross section in FIG. 1, is centrally located in flexible diaphragm 46 and has formed therein a bleed hole 52 and a centrally located pilot hole 54. An upwardly extending tubular projection 55 is formed by valve body section 48 and a passageway 55a is defined thereby. Diaphragm 46 sealingly engages with the upper surface of projection 55 for closing passageway 55a. Diaphragm 46 has a bleed hole 56 formed therein which is aligned with bleed hole 52 and permits fluid communication between upper fluid chamber 44 and a lower fluid chamber 58. Valve body section 48 has an inlet fluid passageway 61 fluidly communicating with fluid chamber 58. A raised conical portion 62 having a horizontally disposed valve seating surface 63 located centrally with respect to center hole 54 is formed on insert 51. Armature means in the form of member 66 is slidably received within guide tube 36 and member 66 is fabricated from a ferromagnetic material. The lower end of armature member 66 has a resilient valve sealing surface 68 provided thereon which is shown in sealing contact with surface 63. Armature member 66 has a thin wall tubular projection 70 extending from the lower end thereof with valve seat 68 received therein and the projection 70 crimped thereover to retain the valve seat in place. Armature 66 has a cylindrical porjection 72 located at the upper end thereof which provides as a registering surface on the inner diameter thereof.

A second biasing means is provided in the form of spring 74 which is wound from a nonmagnet material, and preferably stainless steel, with the upper end thereof reacting against closed end portion 38 and with the lower end thereof registered over cylindrical projection 72. A disk-shaped cover 76 having a registering diameter 78 is provided and is sized so as to be received in press-fitting relationship within the internal diameter of first pole piece 20. Cover 76 also has another registering diameter 80 projecting downward from the bottom surface thereof. A first biasing means in the form of reset spring 81 is provided and is located within first pole piece 20 and the spring 81 has its upper end registered over diameter 80 and its lower end registered over diameter 40. A cylindrical reset button 82 having a flanged end 84 in contact with cover 76 is provided for moving first pole piece 20 downward, and will be subsequently described in greater detail. A retainer member 86 has a centrally located hole 88 and is attached to the upper horizontal leg of second pole piece 24. The diameter of hole 88 is sized to provide a guiding surface for reset button 82 which is slidably received therein. In the preferred practice of the invention the cover 76, reset button 82, and retainer 86 are all formed from a suitable plastic material.

The functional effects of the valve as shown in FIG. 1 with the electrical coil de-energized will now be described. In the absence of any magnetic forces induced by the electrical coil winding 12, springs 74 and 81 determine the positions of armature 66 and first pole piece 20, respectively. The biasing force generated by spring 74 is sufficient in magnitude to maintain resilient valve sealing surface 68 in sealing contact with valve seating surface 63, thereby preventing any fluid contained within fluid chamber 44 from exhausting through center hole 54. Fluid enters chamber 44 by first flowing through passageway 61 and then into fluid chamber portion 58. Bleed holes 56 and 52 permit a relatively small flow of fluid past diaphragm 46 and insert 50 and then into fluid chamber 44. The particular configuration of the upper and lower valve body sections 42 and 48, the diaphragm, and the fluid passageways associated therewith are shown and described for illustrative purposes only and, as such, form no part of this invention.

Figure 2:
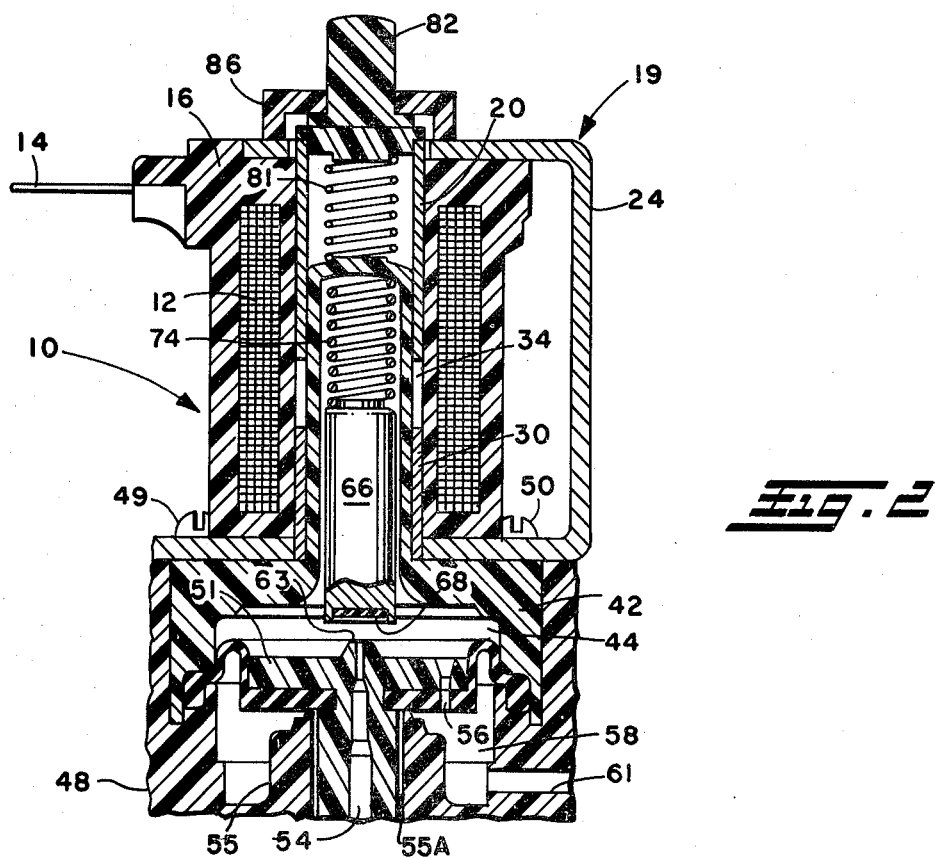
FIG. 2 is a view similar to FIG. 1 showing the valve in an energized position.

Referring now to FIG. 2, upon energization of electrical coil winding 12, a magnetic flux path is set up in first pole piece 20, second pole piece 24, and third pole piece 30. The air gap 34 between the first pole piece 20 and third pole piece 30 contains lines of magnetic force serially continuing the magnetic flux in the pole pieces present across the gap. The lines of magnetic force, being in the vicinity of the upper end of armature 66, are sufficient in magnitude to exert an upward magnetomotive force upon the ferromagnetic material in the armature to overcome the biasing force of spring 74. The armature will move upwardly, tending to reduce the reluctance encountered by the magnetic flux across the air gap, until it reaches a point of equilibrium between the spring force and the magnetic force. The upward movement of the armature causes seal 68 to be spaced from sealing surface 63, thereby performing the valving function and permitting fluid in chamber 44 to exhaust through the center hole 54 faster than fluid can re-enter chamber 44 through bleed holes 52 and 56. A sudden differential fluid pressure is developed across diaphragm 46 which lifts it upwardly away from projection 55 permitting fluid to flow through passageway 55a. As long as the electrical coil 12 remains energized, the magnetomotive force generated across the air gap 34 will be sufficient to maintain the armature in what is also designated as a second position.

Figure 3:
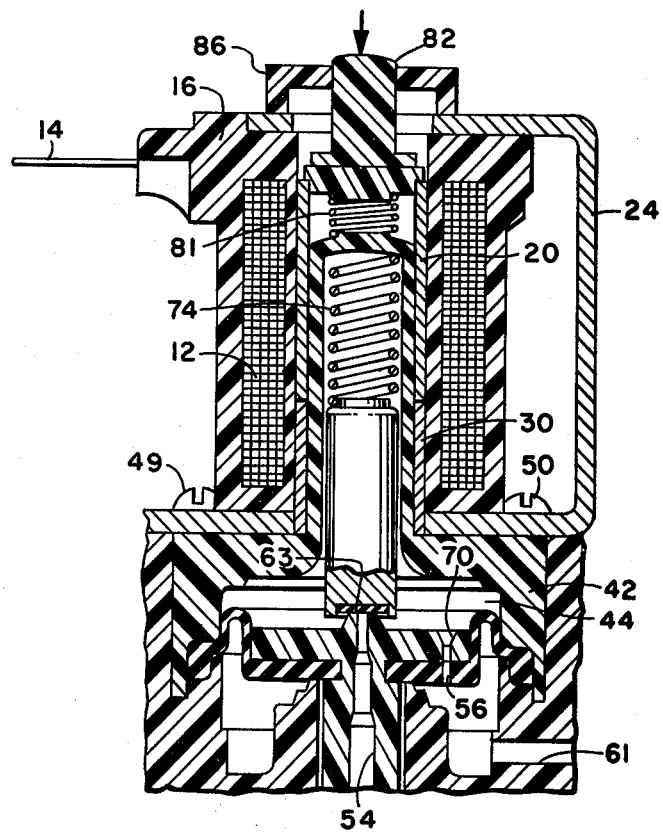
FIG. 3 is a view similar to FIG. 1 showing the valve in mechanically reset position.

Referring now to FIG. 3, the device is shown within a third position in which the first pole piece 20 has been moved downward by an external actuation means, represented by the arrow pointing toward reset button 82, so that the lower end thereof is in contact with the upper end of third pole piece 30. In actual service the reset button 82 can be moved downward automatically by any convenient mechanism, for example, by a bimetallic element sensitive to ambient temperature changes. Alternate methods of actuation, obvious to those having ordinary skill in the art, include manual actuation, mechanical linkages, or vacuum motors.

When first pole piece 20 is in contact with third pole piece 30, and the air gap 34 closed, the magnetic flux tends to remain substantially within the first and third pole pieces to the exclusion of armature 66. The magnetomotive force previously acting upon the armature is thus removed. The only remaining force upon the armature is that generated by spring 74 which is then able to return the armature to its first position in sealing contact with valve seating surface 63. When the first pole piece is in the position shown in FIG. 3, the magnetic flux present in the first pole piece 20 and third pole piece 30 results in a magnetic force of attraction therebetween sufficient to hold the first pole piece in the second position against the biasing tendency of reset spring 81. As long as the electrical coil remains energized, the magnetic force will hold the first pole piece in contact with the third pole piece shunting the air gap and permitting the armature to be moved to the first position.

When the electrical coil is de-energized, the magnetic flux is no longer present in the pole pieces, thus eliminating the magnetic force of attraction therebetween and permitting the reset spring 81 to move the first pole piece to the first position as illustrated in FIG. 1.

Figure 4:
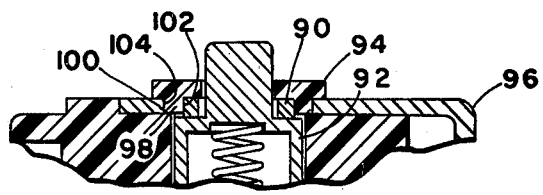
FIG. 4 is a partial cross-sectional view of a second embodiment of the invention.

There is illustrated in FIG. 4 a second embodiment of the invention which uses a fourth pole piece 90, also designated as an auxiliarypole, having an annular ring configuration formed from ferromagnetic material. The first pole piece 92 has a configuration similar to that shown in FIG. 1, however, the disk-shaped cover 76 and cylindrical reset button 82 of the first embodiment have been replaced with an integrally formed component fabricated entirely from ferromagnetic material. A retainer 94 formed from a nonferromagnetic material, preferably a molded thermoplastic, is attached to second pole piece 96. An annular rim portion 98 extends downward from the retainer and defines an outer diameter 100 and an inner diameter 102. The outer diameter 100 of the retainer is pressed into a hole 104 located in second pole piece 96 with the fourth pole piece 90 being pressed into the inner diameter 102. The centrally located hole 104 in the retainer is sized to permit the upper end of the first pole piece to be guided therein. The addition of pole piece 90 has the functional effect of permitting the use of a lower force reset spring since, during energization of the coil, the magnetic force of attraction between fourth pole piece 90 and first pole piece 92 more positively retains and stabilizes the first pole piece in the first position against vibration or chatter caused by magnetic field variation. The operation and effect of the remaining components of the second embodiment are identical with those shown and described in the first embodiment.

The unique feature of having a manual or mechanically actuable override or reset feature permits the electrically operated device of the present invention to be utilized in systems which require manual shut-off in emergency situations without the addition of elaborate and redundant systems or extensive and complicated modifications of the existing electrically operated valve. Although the device has been described herein as a valving mechanism, other related applications and uses of the invention will be obvious to those having ordinary skill in the art.

The embodiments of the invention as shown and described above are representative of the inventive principles as stated herein. It will be understood that variations and departures can be made from the embodiments as shown herein without departing from the scope of the invention as recited in the appended claims.

What is claimed is:

1. An electrically operated device for performing a function in response to energization by an electrical source comprising:
   (a) electrical coil means providing, upon energization by said electrical source, magnetic flux;
   (b) ferromagnetic means defining a first magnetic pole, said first pole being movable between a first and second position; said ferromagnetic means including means defining a second magnetic pole disposed interiorly of said coil means, said second pole being stationary with respect to said coil means, said first and second magnetic poles forming a series magnetic flux circuit, said movable pole having a first position in which said magnetic flux traverses an air gap defined between said second pole means and said first pole, said movable pole having a second position in which said air gap is substantially closed;
   (c) movable armature means disposed within said coil means and spaced closely adjacent said air gap, said armature means being movable between a first and second position in response to magnetomotive force generated by current flow in said coil means, said armature means in said second position being situated so as to minimize the reluctance encountered by said magnetic flux through said air gap;
   (d) means biasing said armature means toward said first position;
   (e) actuating means operably associated with said first ferromagnetic means and operable upon selective movement thereof for moving said first pole means to said second position thereby closing said air gap and dissipating the magnetomotive force on said armature means whereupon said biasing means returns said armature means to said first position.

2. A device as defined in claim 1, wherein said ferromagnetic means defining said first magnetic pole includes a member having an elongated tubular configuration, said ferromagnetic means defining said second magnetic pole includes a portion thereof having a U-shaped configuration and another portion thereof having an elongated tubular configuration.

3. A device as defined in claim 1, wherein said actuating means includes,
   (a) a first member formed from nonferromagnetic material extending axially beyond said coil means and having an end portion thereof in contact with said first pole means;
   (b) a cup-shaped retaining member attached to said second pole defining means and said retaining member having a centrally located hole therein for guiding said member therethrough, said retaining member having a surface for contacting said end for limiting upward movement of said first member.

4. A device as defined in claim 1, wherein said armature means is an elongated cylindrical member formed substantially of ferromagnetic material.

5. A device as defined in claim 1, further including means biasing said first magnetic pole to said first position, said means biasing said first magnetic pole effective upon disengagement of said actuation means and de-energization of said electrical coil means for moving said first magnetic pole from said second position to said first position.

6. A device as defined in claim 1, wherein said ferromagnetic means defines an auxiliary magnetic pole formed of ferromagnetic material disposed along said series magnetic flux path between said first and second pole means, said auxiliary pole located closely adjacent said second pole means and axially aligned with said first pole means, wherein, upon energization of said coil means, said first magnetic pole is maintained in said first position in contact with said auxiliary pole by magnetomotive force.

7. An electrically operated device for performing a function in response to energization by an electrical source, comprising:
   (a) electrical coil means providing, upon energization by said electrical source, a magnetic flux;
   (b) a first pole member formed of ferromagnetic material, said first pole member disposed within said electrical coil and movable between a first and second portion;
   (c) a second pole member having portions thereof disposed within said electrical coil and formed of ferromagnetic material in which first position said first pole member is spaced from said second pole member for defining an air gap therebetween, in which second position said first pole member is in contact with said second pole member for substantially closing said air gap, said first and second magnetic pole members defining a series circuit for said magnetic flux;
   (d) armature means disposed within said electrical coil and movable between a first and second position, said armature means formed substantially of ferromagnetic material;
   (e) means baising said armature means toward said first position, said biasing means effective for balancing a magnetomotive force acting upon said armature means in said second position, said armature means in said second position being urged by said magnetomotive force toward a position minimizing the reluctance encountered by said magnetic flux across said air gap;
   (f) actuator means operably connected to said first pole member for moving said first pole member to said second position in contact with said second pole member for substantially eliminating said magnetomotive force acting upon said armature means, whereupon said biasing means returns said armature means to said first position.

8. A device as defined in claim 7, wherein said (a) said first pole member has an elongated tubular configuration; and
(b) said second pole member includes a portion thereof having a U-shaped configuration and another portion thereof having an elongated tubular configuration.

9. A device as defined in claim 7, wherein said actuator means includes,
   (a) a first member formed from nonferromagnetic material extending axially beyond said coil means and having an end portion thereof in contact with said first pole member; and
   (b) a cup-shaped retaining member attached to said second pole member, said retaining member having a centrally located hole thereins for guiding said first member therethrough, said retaining member having a surface for contacting said end for limiting upward movement of said first member.

10. A device as defined in claim 1, wherein said armature means is an elongated cylindrical member formed substantially of ferromagnetic material.

11. A device as defined in claim 7, further including an auxiliary pole formed of ferromagnetic material disposed along said series magnetic flux path between said first and second pole members, said auxiliary pole located closely adjacent said second pole member and axially aligned with said first pole member, wherein, upon energization of said coil means, said first pole member is maintained in said first position in contact with said auxiliary pole by magnetomotive force.

12. An electrically operated valving device for valving a fluid port between an open and closed position comprising:
   (a) electrical coil means providing, upon energization by said electrical source, a magnetic flux;
   (b) a first pole member formed of ferromagnetic material, said first pole member disposed within said electrical coil and movable between a first and second position;
   (c) a second pole member having portions thereof disposed within said electrical coil and formed of ferromagnetic material, in which first position said first pole member is spaced from said second pole member for defining an air gap therebetween, in which second position said first pole member is in contact with second pole member for substantially closing said air gap, said first and second magnetic pole members defionming a series circuit for said magnetic flux;
   (d) armature means disposed within said electrical coil and movable between a first and second position, said armature means formed substantially of ferromagnetic material including means operably connected thereto for valving said fluid port as said armature means moves between said first and second position;
   (e) means biasing said armature means toward said first position, said biasing means effective for balancing a magnetomotive force acting upon said armature means in said second position when said electrical coil is energized, said armature means in said second position being urged by said magnetomotive force toward a position minimizing the reluctance encountered by said magnetic flux across said air gap;
   (f) actuator means operably connected to said second pole member for moving said second pole member to said second position in contact with said first pole member for substantially eliminating said magnetomotive force acting upon said armature means, whereupon said biasing means returns said armature means to said first position.

13. A device as defined in claim 12, further including means biasing said first pole member to said first position, said means biasing said first pole member effective upon disengagement of said actuation means and de-energization of said electrical coil means for moving said first pole member from said second position to said first position.

14. A device as defined in claim 12 wherein,
   (a) said first pole member has an elongated tubular configuration; and
   (b) said second pole member includes a portion thereof having a U-shaped configuration and another portion thereof having an elongateds tubular configuration.

15. A device as defined in claim 12, wherein said actuator means includes,
   (a) a first member formed from nonferromagnetic material extending axially beyond said coil means and having an end portion thereof in contact with said first pole member; and
   (b) a cup-shaped retaining member attached to said second pole member, said retaining member having a centrally located hole therein for guiding said first member therethrough, said retaining member having a surface for contacting said end for limiting upward movement of said first member.

16. A device as defined in claim 12, wherein said armature means is an elongated cylindrical member formed substantially of ferromagnetic material.

17. A device as defined in claim 12, further including means biasing said first pole member effective upon disengagement of said actuation means and de-energization of said electrical coil means for moving said first pole member from said second position to said first position.

18. A device as defined in claim 12, further including an auxiliary pole formed of ferromagnetic material disposed along said series magnetic flux path between said first and second pole member, said auxiliary pole located closely adjacent said second pole member and axially aligned with said first pole member, wherein, upon energization of said coil means, said first pole member is maintained in said first position in contact with said auxiliary pole by magnetomotive force.

* * * * *